(12) United States Patent
Michalec (10) Patent No.: US 12,161,092 B2
(45) Date of Patent: Dec. 10, 2024

(54) ANIMAL FEEDER

(71) Applicant: Sendero Outdoors Inc., Boerne, TX (US)

(72) Inventor: John Michalec, Boerne, TX (US)

(73) Assignee: Sendero Outdoors Inc., Boerne, TX (US)

( * ) Notice: Subject to any disclaimer, the term of this patent is extended or adjusted under 35 U.S.C. 154(b) by 0 days.

(21) Appl. No.: 17/877,260

(22) Filed: Jul. 29, 2022

(65) Prior Publication Data

US 2023/0032509 A1 Feb. 2, 2023

Related U.S. Application Data

(60) Provisional application No. 63/226,903, filed on Jul. 29, 2021.

(51) Int. Cl.
*A01K 5/02* (2006.01)

(52) U.S. Cl.
CPC .......... *A01K 5/0291* (2013.01); *A01K 5/0225* (2013.01)

(58) Field of Classification Search
CPC .. A01K 5/0291; A01K 5/0225; A01K 5/0275; A01K 5/0258; A01K 5/0283
See application file for complete search history.

(56) References Cited

U.S. PATENT DOCUMENTS

| | | | |
|---|---|---|---|
| 7,866,579 B2 | 1/2011 | Chism | |
| 9,301,495 B1 * | 4/2016 | Bogart | A01K 5/005 |
| 9,700,014 B1 * | 7/2017 | Bogart | A01K 5/0225 |
| 9,854,784 B2 * | 1/2018 | Frieden | A01M 29/30 |
| 10,810,527 B2 * | 10/2020 | Lauve, IV | G06Q 10/06314 |
| 2010/0307421 A1 * | 12/2010 | Gates | A01K 5/0225 119/57.91 |
| 2015/0008822 A1 * | 1/2015 | Gates | H05B 47/19 315/76 |
| 2015/0359191 A1 * | 12/2015 | Eakin | A01K 5/0225 119/52.1 |
| 2017/0188440 A1 * | 6/2017 | Gates | F21S 10/023 |

(Continued)

FOREIGN PATENT DOCUMENTS

EP 2923567 A1 * 9/2015 ............... A01K 5/02

*Primary Examiner* — Ebony E Evans
(74) *Attorney, Agent, or Firm* — Outlier Patent Attorneys, PLLC (57) ABSTRACT

An apparatus for feeding animals includes a hopper to store animal feed and a motor-driven spinner beneath the hopper, that radially spreads feed dropping from an opening in a bottom of the hopper. A timer control unit provides timer control of the motor, and includes an antenna that receives signals from a remote controller for remotely initiating a feed dispersal event and for remotely turning on a light on the feeder to selected levels of brightness including turning the light off. The apparatus may include a distribution adapter that has a first position, in which feed from the spinner is broadcast outwardly to an area surrounding the apparatus, and a second position, in which feed from the spinner is deflected downward to be distributed into troughs associated with the apparatus. The apparatus may further include housings that support the motor-driven spinner, and are configured to permit a directional deflector to be incorporated to provide a direction dispersion pattern that blocks a portion of 360° dispersion pattern of the spinner.

16 Claims, 9 Drawing Sheets

(56) References Cited

U.S. PATENT DOCUMENTS

2018/0249678 A1\* 9/2018 Chang .................. A01K 5/0291
2019/0014742 A1\* 1/2019 Leggett ................ A01K 5/0291
2022/0142118 A1\* 5/2022 Olson ................. A01M 31/002

\* cited by examiner

ANIMAL FEEDER

CROSS-REFERENCE TO RELATED APPLICATIONS

This non-provisional patent application claims priority to provisional patent application 63/226,903 filed Jul. 29, 2021.

BACKGROUND

Field of the Art

This disclosure relates to animal feeders that dispense feed using, for example, a motor-driven rotating spinner head. Specifically, three improvements for feeders are described herein.

In a first improvement, a feeder has capability to operate either in a broadcast mode in which feed is spread radially into an area surrounding the feeder or in a trough mode in which feed is directed into troughs attached to or associated with the feeder.

In a second improvement, a feeder has capability to broadcast feed as limited in a specific direction that can be selectively configured.

In a third improvement, a feeder having incorporated therewith a timer that selectively sets the time and duration the feeder motor operates to disperse feed further incorporates a receiver that receives a signal from a remote controller that selectively provides control for remotely turning on the feeder motor to disperse feed and/or remotely turning on/off a light located on the feeder.

Discussion of the State of the Art

Figure 1:
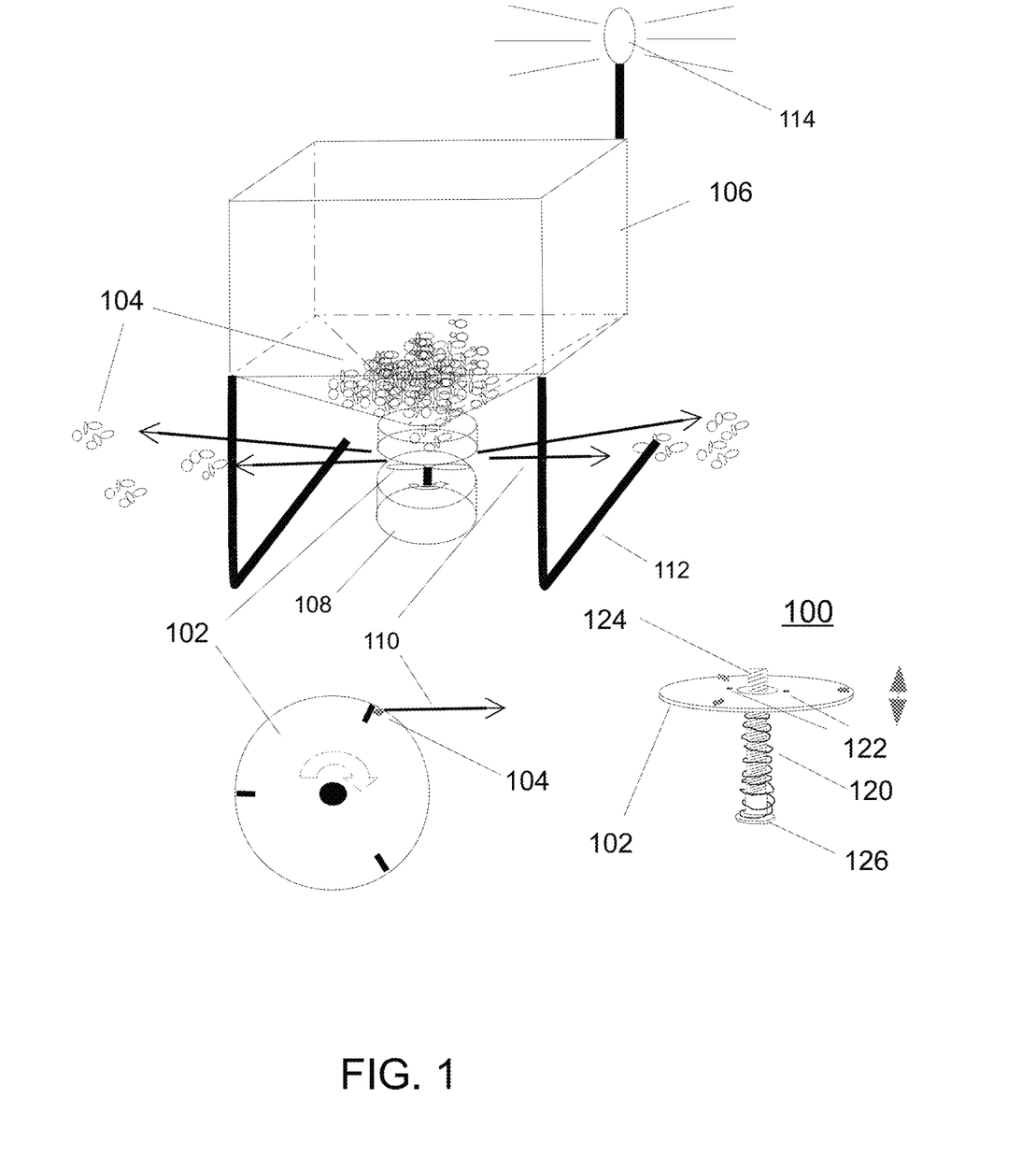
FIG. 1 exemplarily illustrates functions of animal feeders that broadcast feed in a 360° pattern around the feeder, using a feeder configuration developed by the present inventor as a basis for implementing the improvements of the present invention.

Relative to the first improvement described herein and as exemplarily shown in FIG. 1, game feeders 100 using a motor-driven spinner plate 102 to spread feed 104 stored in a hopper 106 are used to attract and feed deer and other animals using, for example, corn as the feed. With the motor 108 spinning these game feeders broadcast 110 feed 104 falling down and out of the hopper 106 outward away from the feeder to cover the ground surrounding the game feeder.

It is noted that the specific configuration of the feeder 100 shown in FIG. 1 is not a prior art feeder even if some of the functions are known in the art. Rather than describing a conventional animal feeder, the configuration of FIG. 1 shows a feeder configuration used as a basis by the inventor in the development of the improvements of the present invention and is used as background to explain the various improvements described in the present invention. Nonetheless, various design details of this configuration, such as, for example, the configuration of the support structure 112 and the manner for attaching the spinner plate 102/motor 108 assembly to the feeder 100 differ from various prior art game feeders such as demonstrated in U.S. Pat. Nos. 9,700,014 and 9,301,495 to Bogart. More specifically, in this configuration 100 used as a basis for the present invention, the struts 112 support the hopper 106, and the motor 108/spinner plate 102 hang down from and are supported by the hopper 106. The configuration of FIG. 1 additionally demonstrates a basic feature in game feeders of using a motor-driven spinner plate 102 to disperse feed 104.

Similarly, animal feeders for feeding domestic animals often likewise use a motor-driven spinning disc to distribute the feed from a hopper into feeding troughs associated with the animal feeder using any of various possible deflection mechanisms. For example, a protein-rich feed, such as shown in the '495 patent to Bogart uses a tubular skirt surrounding the opening through which feed is flung by the spinning disc such that outward flung feed impacts the fixed tubular skirt and falls down into the underlying trough instead of being broadcast outward as in the game feeder described in Bogart's '014 patent.

The opening at the bottom of the hopper 106 so that feed 104 can drop in a controlled manner onto the spinner plate 102 for dispersion is known in the art and not considered important relative to novelty of the present inventions. For example, one conventional manner for controlling such an opening is that of using a mechanism having weights so that the centripetal force generated by the spinning motor 108 causes an outward movement that shortens the linkage pushing a cover to close off the bottom hole in the hopper. This shortening creates a controlled opening for the feed 104 to drop out of the bottom of the hopper 106. Such weights can be formed as links in a chain section, such as demonstrated in U.S. Pat. No. 7,866,579 to Chism and used in the aforementioned '014 and '495 patents to Bogart.

Another conventional method based on a simple gravity feed, as demonstrated in U.S. Pat. No. 10,810,527 to Lauve, et al., is to provide a gap between the spinner plate 102 and the bottom of the opening in the bottom of the hopper 106 such that feed falling from the hopper builds up and stops falling from the hopper opening when the spinner plate 102 is stationary. When the spinner plate 102 spins, the feed on the spinner plate 102 is flung outward and replacement feed falls onto the rotating spinner plate 102 through the opening at the bottom of the hopper 106.

In contrast to the two above-mentioned methods of controlling the feed exiting from the bottom opening in the hopper of a feeder, the feeder upon which the improvements described herein are implemented uses yet another conventional method to uncover the opening at the bottom of the hopper when the motor 108 turns the spinner plate 102.

In this method, as exemplarily demonstrated in the lower right section of FIG. 1, the cover of the opening at the bottom of the hopper 106 is the spin plate 102, which is pushed upward by a compression spring 120 to seal off the hopper opening when the motor 108 is static (i.e., turned OFF). The spinner plate 102 is mounted via two (or more) bolts or screws 122 to a poly nut (not visible in FIG. 1) so that the spinner plate 102 is associated to threads of the screw lead 124, which screw lead 124, in turn, is inserted into hub 126 that is connected to the shaft of motor 108 so that the motor 108 will rotate the spin plate 102 when the motor 108 is ON. Two washers, one at the top and one at the bottom of compression spring 120 (not shown in FIG. 1), serve to stably clamp the compression spring 120 to the screw lead 124 as the screw lead 124 is rotated by the motor 108 and as the spin plate 102 moves up/down in response to the interplay of forces from the compression spring 120 and rotation by the motor 108.

More specifically, the spinner plate 102 becomes a "drop-down spinner plate" because, when the motor 108 is OFF, the compression spring 120 pushes the spinner plate 102 upward so that the spinner plate 102 seals the opening at the bottom of the hopper. When the motor 108 is turned on, the screw lead 124 rotates, and the spinner plate 102, as connected to the threads of the screw lead 124 via the poly nut, also attempts to rotate. Because of weight of feed in the hopper and inertia of the spinner plate 102, the spinner plate 102 will experience a downward force such that it travels downward along the threads of the screw lead 124, thereby compressing the compression spring 120. The mechanism has been designed so that the interplay between these two forces causes the spinner plate 102 to drop down a predetermined distance to permit feed from the hopper to drop onto the spinner plate 102 and be broadcast outward by the fins on the top surface of the spinner plate 102. When the motor 108 is turned OFF, the compression spring 120 forces the spinner plate 102 back upward along the screw lead threads to seal the opening of the hopper.

Although exemplary embodiments of the invention uses this drop-down spinner plate mechanism, the present invention is not limited by the specific type of mechanism used to allow feed to drop from the bottom of the hopper onto the spinner plate 102, since any number of possible mechanisms, including any of those described above, can be utilized for getting feed from the hopper onto the surface of the spinner plate 102 for distribution.

Returning now to problems being addressed by the improvements of the present invention, conventional animal feeders are configured to be either a game feeder that broadcasts feed from a hopper to cover the ground around the feeder or an animal feeder that drops the feed from the hopper into troughs associated with the feeder, as demonstrated, for example, in the aforementioned '014 and '495 patents to Bogart.

The present inventor has recognized that the conventional game feeders would not serve well as a feeder for domestic animals since as much as 80% of the protein-based feed used for domestic animals would be lost if broadcast to cover the ground rather than being diverted into troughs.

Relative to the second improvement described herein, conventional animal feeders distribute feed from their hopper in a 360 degree distribution, similar to the functionality of the precursor configuration shown exemplarily in FIG. 1. This second improvement of the invention arose from a recognition that there are scenarios in which it would be desirable to limit the distribution to specific directional areas.

Relative to the third improvement described herein, some conventional animal feeders already incorporate a timer to control when and for how long a feed dispersal event occurs. However, the inventor has recognized that such timer controller could be improved, given that an animal feeder is used to lure animals during a hunting or wildlife photography or viewing session such that it would be beneficial to have remote control for one or more features of the feeder.

SUMMARY

In a first improvement to animal feeders, the present invention recognizes a need in the art to be able to easily change configurations of an animal feeder from a feeder that broadcasts feed as a game feeder into a feeder that drops the feed into troughs instead of broadcasting the feed outward on the surrounding ground and vice versa. Preferably, as in the present invention, these conversions are achievable without having to change parts on the feeder to reconfigure the feed for each conversion or, alternatively, to buy a feeder capable of performing only one feed dispersal function.

By providing a capability to change between a broadcast mode of feed distribution and a trough mode of feed distribution, the present invention provides an animal feeder that can be reconfigured to feed animals in different situations, and it achieves this benefit without having to replace parts on the feeder for making each dispersal conversion.

In the second improvement, the present invention recognizes that there is a need in the art to be able to control the direction of distribution of feed from an animal feeder. For example, a game feeder might be situated near water or a cliff so that certain directions would waste the feed that is distributed in those specific directions. Additionally, if a feeder is used to lure an animal into a more favorable specific location, for example, to get a better shot for photography or hunting, then it would be desirable to be able to configure the game feeder to distribute feed only in that specific direction.

Moreover, since an animal feeder might be associated with feeder troughs that receive the distributed feed for presentation to domesticated animals, the present invention permits that selection of which specific troughs receive the distributed feed. For example, if the feeder is located against a wall, it would be desired to be able to eliminate feed distribution in the direction of the wall.

By providing a capability to limit distribution direction, the present invention provides an animal feeder that can be selectively reconfigured as desired to direct the feed distribution in a specific location relative to the animal feeder.

In the third improvement, the present invention recognizes that there is a need in the art to be able to control remotely a feed dispersal event from an animal feeder, particularly when the animal feeder is being used to lure animals during a hunt or wildlife viewing or photography session, when it would be desirable that the hunter not reveal him or herself to initiate a feed dispersal event. The present invention provides a remote controller to allow remote initiation of a feed dispersal event, as well as capability to remotely turn on a light 114, sometimes referred to as a "hog light", mounted on or associated with the animal feeder. The light 114 allows for night hunting or night viewing of animals. Accordingly, the present invention introduces a remote controller that permits a user to remotely initiate a feed dispersal and/or operate a "hog light" mounted on the feeder, all in one timer module.

BRIEF DESCRIPTION OF THE DRAWING FIGURES

The accompanying drawings illustrate several embodiments and, together with the description, serve to explain the principles of the invention according to the embodiments. It will be appreciated by one skilled in the art that the particular arrangements illustrated in the drawings are merely exemplary and are not to be considered as limiting of the scope of the invention or the claims herein in any way.

DETAILED DESCRIPTION

The invention is described by reference to various elements herein. It should be noted, however, that although the various elements of the inventive apparatus are described separately below, the elements need not necessarily be separate. The various embodiment may be interconnected and may be cut out of a singular block or mold. The variety of different ways of forming an inventive apparatus, in accordance with the disclosure herein, may be varied without departing from the scope of the invention.

Generally, one or more different embodiments may be described in the present application. Further, for one or more of the embodiments described herein, numerous alternative arrangements may be described; it should be appreciated that these are presented for illustrative purposes only and are not limiting of the embodiments contained herein or the claims presented herein in any way. One or more of the arrangements may be widely applicable to numerous embodiments, as may be readily apparent from the disclosure. In general, arrangements are described in sufficient detail to enable those skilled in the art to practice one or more of the embodiments, and it should be appreciated that other arrangements may be utilized and that structural changes may be made without departing from the scope of the embodiments. Particular features of one or more of the embodiments described herein may be described with reference to one or more particular embodiments or figures that form a part of the present disclosure, and in which are shown, by way of illustration, specific arrangements of one or more of the aspects. It should be appreciated, however, that such features are not limited to usage in the one or more particular embodiments or figures with reference to which they are described. The present disclosure is neither a literal description of all arrangements of one or more of the embodiments nor a listing of features of one or more of the embodiments that must be present in all arrangements.

Headings of sections provided in this patent application and the title of this patent application are for convenience only and are not to be taken as limiting the disclosure in any way.

Devices and parts that are connected to each other need not be in continuous connection with each other, unless expressly specified otherwise. In addition, devices and parts that are connected with each other may be connected directly or indirectly through one or more connection means or intermediaries.

A description of an aspect with several components in connection with each other does not imply that all such components are required. To the contrary, a variety of optional components may be described to illustrate a wide variety of possible embodiments and in order to more fully illustrate one or more embodiments. Similarly, although process steps, method steps, or the like may be described in a sequential order, such processes and methods may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the embodiments, and does not imply that the illustrated process is preferred. Also, steps are generally described once per aspect, but this does not mean they must occur once, or that they may only occur once each time a process, or method is carried out or executed. Some steps may be omitted in some embodiments or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Alternate implementations are included within the scope of various embodiments in which, for example, functions may be executed out of order from that shown or discussed, including substantially concurrently or in reverse order, depending on the functionality involved, as would be understood by those having ordinary skill in the art

The First Improvement: Broadcast/Trough Feeder Distribution

The first improvement described in the present invention provides an animal feeder that can be reconfigured to serve as either a game feeder that broadcasts feed or a trough feeder that drops feed into associated troughs, for example, for domesticated animals, and that can be moved to a different location to serve as a feeder using a different distribution mode.

Overview

In the first improvement for feeders, the apparatus of the present invention provides an adapter mechanism that permits an animal feeder to serve a role as a game feeder that broadcasts feed onto the ground surrounding the feeder, for wildlife, or to serve a role as a feeder for domesticated animals and wildlife that drops feed from the hopper into one or more troughs associated with the feeder. For example, in some scenarios, deer are fed protein-based feed starting in February through September, and after that time the feed is changed to corn. The present invention provides a feeder that permits easy and convenient changeovers using the same feeder, while permitting the protein-based feed to be fully utilized by dispensing it in troughs rather than broadcasting it on the ground.

It is noted that if one or more flaps are deployed in their down position and there is no associated trough for that flap or the trough has been removed, this feature also thereby provides a method to divert feed differently in a broadcast mode, and this different broadcast mode distribution can be implemented in a directional manner by choosing which flaps will be lowered while in the broadcast mode.

Apparatus

Figure 2A:
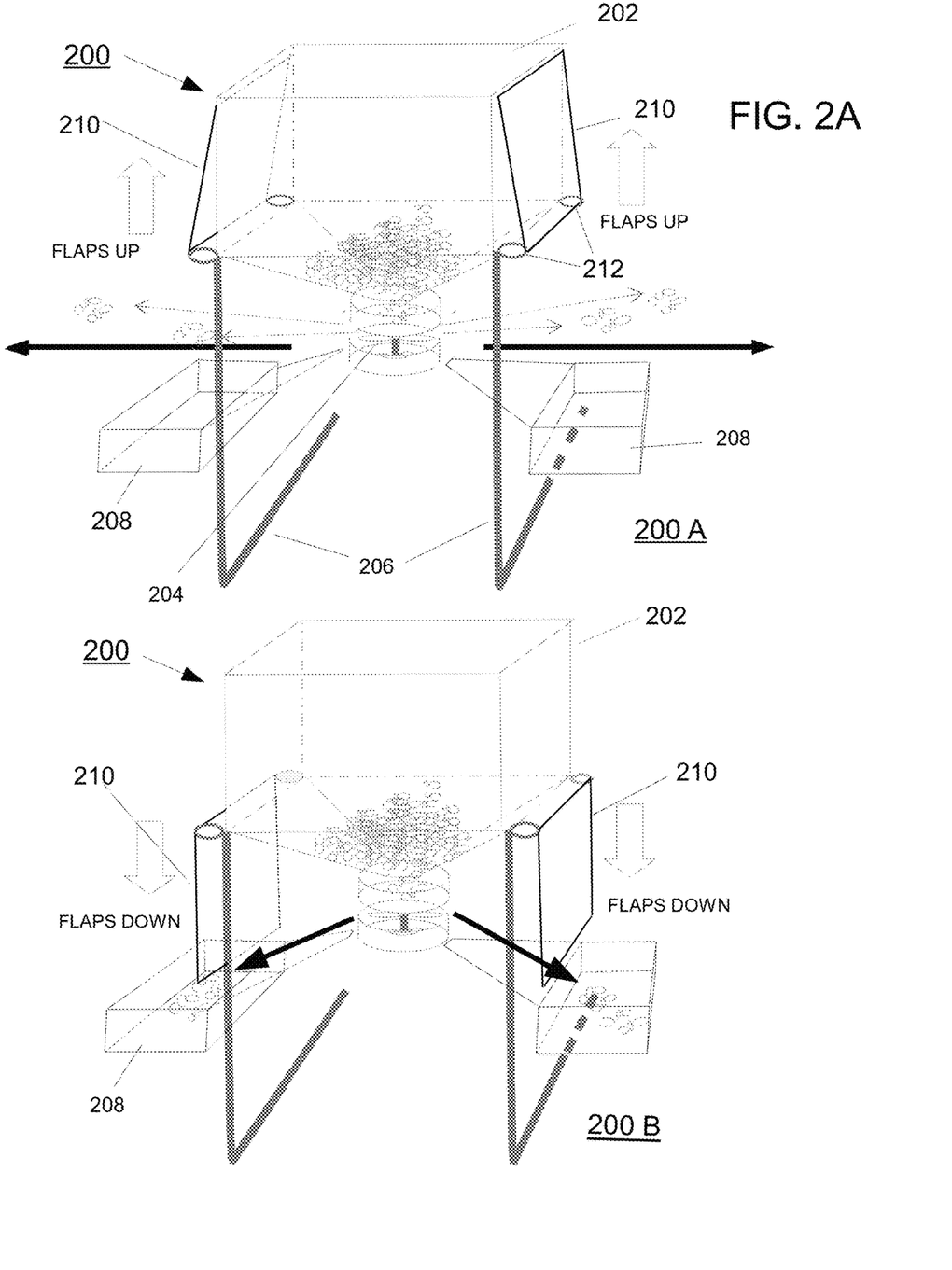
FIG. 2A and FIG. 2B illustrate exemplary embodiments of the present invention of an animal feeder having a plurality of flaps 210 that can be configured in either a broadcast distribution mode 200A, 200C or a trough distribution mode 200B, 200D. However, it is noted that the lowered flaps shown in views 200C and 200D can be lowered independently, thereby providing capability to have a broadcast mode in some directions and trough mode in other directions. Additionally, if the trough is removed when its associated flap is lowered, the lowered flap provides a way to modify the normal broadcast mode distribution pattern, and such modification can be applied directionally by choosing which flaps are lowered and which troughs are removed.

FIG. 2A illustrates the inventive apparatus in accordance with one exemplary embodiment of the invention. In particular, FIG. 2A illustrates an exemplary configurable animal feeder 200 having a feed hopper 202 that stores feed to be distributed using a motor-driven spinner mechanism 204 as described in reference to FIG. 1. The exemplary feed hopper 202 in FIG. 2A is shown as having four sides such that, from a view looking downward, the hopper 202 would form either a square or rectangle, although it should be clear that other shapes, including, for example, a circular hopper shape, or even pentagon or other shapes would be possible.

The feed hopper 202 is exemplary supported on skid legs 206. Although two skid legs are shown in FIG. 2A for purpose of describing the invention, it should be clear that different skid leg configurations are possible, including, for example, a configuration in which the four corners of a square- or rectangular-shaped (from a plan view looking downward) hopper is supported by two skids legs 206, or each corner could have its one respective skid leg. The skid legs 206 not only support the hopper 202 but also permit the feeder 200 to be moved for different locations and purpose. It should also be clear that configurations are possible that incorporate wheels (not shown) that would facilitate movement of the feeder 200, or that the feeder could be supported by a plurality of simple support legs rather than skid structures.

Associated with the hopper 202, as either attached to the skid legs 206 or as selectively attachable to the skid legs 206, are a plurality of feed troughs 208. The exemplary embodiment in FIG. 2A having a square- or rectangular-shaped (from a plan view looking downward) hopper 206 might have four such feed troughs 208, although only two troughs are illustrated in this figure for simplicity. However, it should also be clear that these troughs 208 need not be physically attached to the feeder as shown in the exemplary embodiments, but rather, these troughs could be placed on the ground such as to catch feed as it drops down from the feeder, or they could be placed adjacent to the feeder as located on their own separate support stands. All that is necessary is that the troughs be associated with the feeder and located such as to be able to catch feed as it is dispensed from the feeder when the feeder is configured to be in the trough mode shown in view 200B.

Additionally, it should be clear that the troughs exemplarily shown in FIG. 2A, could vary in number. For example, there could be a single trough that fits around the feeder as a single trough, or two troughs configured so that one trough is shaped to serve two sides of the feeder and a second trough is shaped to serve the other two sides of the feeder. It should also be clear that one or more of these troughs could be solidly attached to the frame of the feeder, whereas another one or more troughs could be selectively attachable to the frame or even non-attached or non-attachable and mounted next to the feeder to catch the feed dropping from the feeder.

Although not shown in FIG. 2A, it should also be clear that, for ease in moving to different locations, these skid legs 206 could incorporate some type of wheel assembly, particularly for larger and heavier feeders 200. Such wheels might be incorporated into the skid legs, for example, such that the wheel contacts the ground when the feeder 200 is tilted for purpose of moving. Another possible wheel configuration might have wheels that rotate and lock into different positions such that the wheels would be raised and locked during feeding mode and would be lowered and locked during a move mode. Yet other non-limiting wheel configurations might use provisions on the skid legs 206 that would permit wheels to be added to the skid legs 206 for purpose of moving the feeder 200.

To distribute feed that falls through an opening in the bottom of the hopper 202, a motor-driven spinner mechanism 204 broadcasts the feed outward, and this same distribution mechanism is used in both the broadcast mode shown in top view 200A and the trough mode shown in bottom view 200B. Not explicitly shown in FIG. 2A, since it is not necessary to understand the present invention and is common in the art, is a mechanism that closes the bottom opening of the hopper when the motor is not operating and opens the bottom opening when the motor operates, so that the feed drops out of the hopper only if the motor-driven spinner 204 is operating and the opening is closed otherwise to keep feed from escaping from the hopper. However, as discussed above in reference to FIG. 1, any of various conventional methods of controlling the falling of the feed from the hopper could be used, including a method in which the hole does not get closed.

To change the distribution mode between broadcast mode in which feed is broadcast radially outward from the feeder 200 and the trough mode in which feed is dropped into the troughs 208, the present invention incorporates a novel feature of a distribution adapter mechanism 210. In a preferred embodiment, the distribution adapter 210 is attached so that it can easily be switched between the two modes of distribution, such as by, for example, a hinge mechanism 212 that permits the flap 210 to be positioned in one of either the up position (for the broadcast mode of view 200A) or the down position (for the trough mode of view 200B). The present invention also envisions a kit of parts that can be added to an existing feeder to provide this capability of providing two distribution modes.

In the exemplary embodiment shown in FIG. 2A, the distribution adapter 210 comprises two flaps 210 that can be selectively folded down to form a capturing mechanism that, during the trough mode, diverts feed from the spinner 204 to slide down into the feeding troughs 208 rather than being broadcast outward as occurs during the broadcast mode.

Latches, preferably spring-loaded latches, as appropriate are used to latch the flaps 210 in the desired position. Typically, four troughs rather than two as shown in FIG. 2A would be provided in the feeder 200 having a square-shaped hopper 202, and, in such case, there would typically be four flaps 210, one for each trough.

Although FIG. 2A exemplarily shows angles for the flaps 210 in their raised position (view 200A) and lowered position (view 200B), such angles are not intended as limiting since, for example, in the lowered position (view 200B), the angle of the angle of the lowered flap 210 could be set to be at an angle different from the vertical 90° angle exemplarily shown in the figure. For example, based on the relative width of the trough 208, a setting of, for example, 120° might provide a better distribution of feed into the troughs 208 during the trough mode.

Figure 2B:
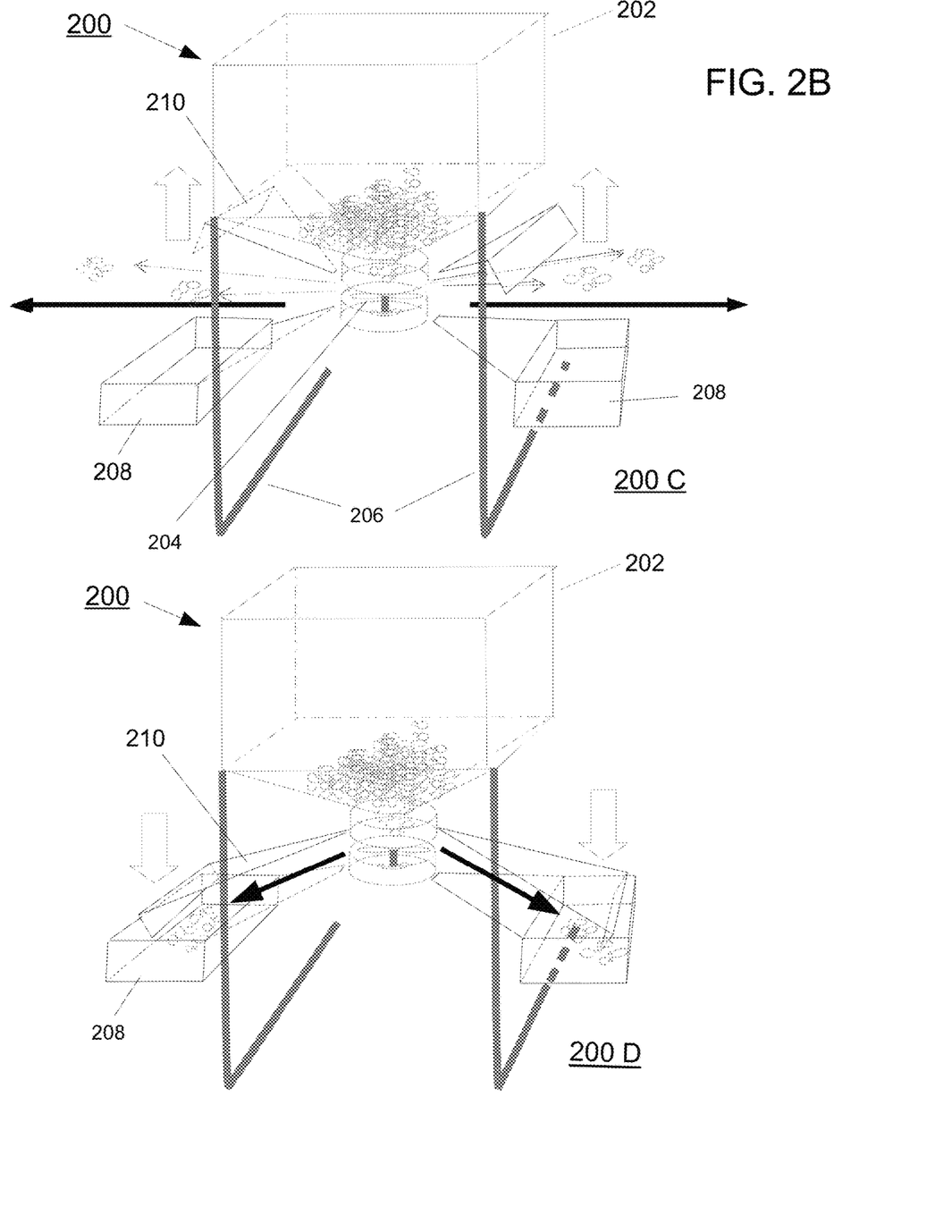

FIG. 2B shows an alternate configuration for locations for hinging the flaps 210 as locations inboard of those shown in FIG. 2A, as closer to the housing of the spinner plate 204, either as hinged to the spinner plate housing or to brackets on the lower surface of the hopper 202. In this exemplary embodiment, the flaps 210 in their raised position, the broadcast mode, shown in view 200C permit feed to be broadcast outward without interference. In their lowered position, the trough mode shown in view 200D, the flaps 210 are lowered to form a "chute" in which feed spun out by the spinner plate 204 is directed to fall onto the inverted funnel structure forming the floor structure below the motor mount and then slides down into the troughs 208. Although FIG. 2B exemplarily shows the flaps 210 as shaped on their ends to further divert the feed, such shape might not be necessary if the flaps 210 can be sufficiently lowered so that the feed flung out by the spinner plate 204 is adequately captured by the outer wall of the chute structure. Similar to the comment for FIG. 2A, a typical feeder might have more than the two troughs 208 and flaps 210 exemplarily shown in the figure.

It should be clear to one having ordinary skill in the art that other hinging configurations for the flaps 210 would be possible from those shown in FIG. 2A and FIG. 2B. For example, in the hinge configuration shown in FIG. 2A, if the troughs 208 extend outwardly (distally) from the feeder 200, then it might be preferable to form a flange around the lower periphery of the hopper 202 and hinge the flaps 210 to the outboard (distal) edges of the flange, thereby permitting the feed to land in a better location in troughs 208 that are relatively wider than those shown exemplarily in FIG. 2A and FIG. 2B.

It should also be clear to one having ordinary skill in the art that the hinged flap adapter mechanism of the present invention has a key benefit of providing a feeder that can be readily converted between broadcast mode and trough mode, in contrast to the fixed configurations demonstrated in the '014 and '495 patents briefly described above. Additionally, it should be clear that, when a plurality of flaps are available for a feeder, that only a selected one or ones of these flaps could be in a down position while remaining flaps remain in the up position, thereby providing a capability to implement any of a number of hybrid broadcast/trough modes.

Similarly, for feeders having associated troughs, another hybrid distribution mode becomes possible by placing one or more of the flaps down into the trough mode position and then removing the associated trough, thereby providing a modified broadcast pattern.

Although the exemplary embodiment is explained using flaps that fold down to configure the feeder into the trough mode, it should be clear that other adapter configurations are possible. For example, rather than folding down, the flaps could be replaced by a diverter mechanism that is not hinged but rather is movable as a unit, to be positioned to be out of the way during the broadcast mode but provided with a mechanism so that it can be lowered down (or possibly raised up) as a unit, to serve as a deflector during the trough mode. Alternatively, in some exemplary embodiments, the flaps could be detachable, so that they are removed (i.e., detached) to provide a broadcast mode and installed (i.e., attached) to provide the trough mode.

Additionally, although the exemplary embodiment uses a hopper 202 and distribution adapter 210 based on a square or rectangular shape when viewed from above, it should be clear that the present invention is not limited to four-sided shapes, since other shapes such as a triangle, hexagon, etc., could also be used. The present invention discloses using a distribution adapter 210 that can be placed into one of two possible positions to convert the distribution from the spinner to be either in a broadcast mode in which the spinner output is spread outward from the feeder, or in a trough mode in which the spinner output is deflected to be distributed into associated troughs.

Relative to a kit of parts for retrofit of this feature into a conventional feeder and in view of the description above, it should be clear that the kit of parts could assume any of a number of variations, depending upon the details of the feeder to be modified. A conversion kit would include one or more deflector flaps 210 for diverting the feed into a trough, but a shape and number of the flaps would depend upon details of the design of the feeder to be modified. A kit of parts would also include one or more hinges for each flap, as well as latches to latch the flap(s) in each of the two possible positions. The kit may also include a replacement component for the feeder to be modified that will be used in the modified feeder to mount the flap to be incorporated, or a set of instructions could be provided that details how to drill holes in an existing component in order to mount the hinges for the flaps to be incorporated. Similarly, the kit may have a replacement component upon which the latches are mounted, or instructions could be provided for drilling holes in existing components for the purpose of installing latches for the flaps.

Second Improvement: Directional Control for Distribution

The second improvement described herein provides an animal feeder that can be selectively reconfigured to distribute feed in a desired direction or, more accurately, to preclude dispersion in a specific direction.

Overview

In this improvement, the apparatus of the present invention provides a directional distribution mechanism that can be reconfigured so that a game feeder will distribute feed in all directions except a specific direction. The invention includes an embodiment in which a kit of parts would permit an existing game feeder to be modified to incorporate the directional distribution mechanism of the present invention.

Apparatus

Figure 3:
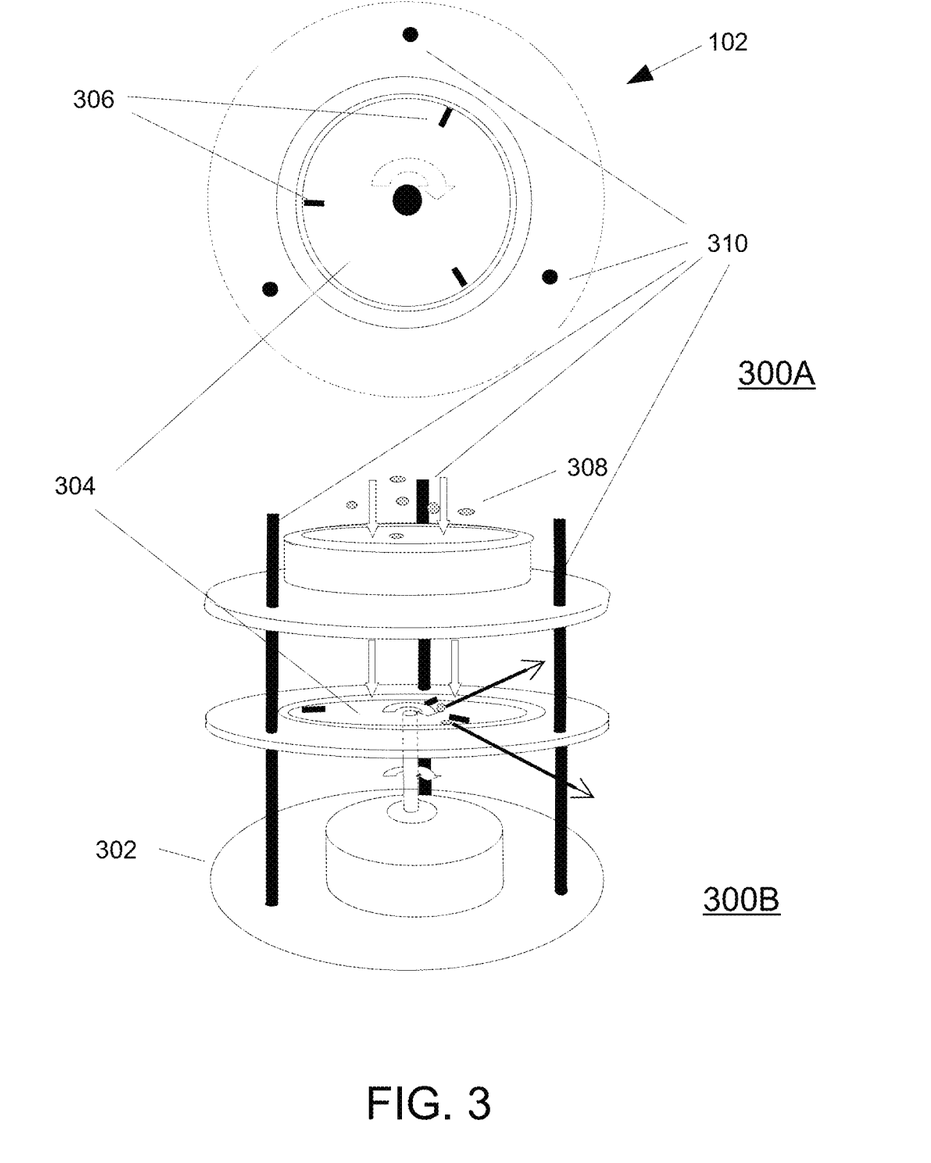
FIG. 3 exemplarily illustrates a conventional mechanism for broadcasting in which there is no directional distribution capability.

FIG. 3 shows in greater detail the motor-driven feed distribution mechanism 102, as previously shown in FIG. 1 and as seen looking from above (top image, view 300A) and from a side view (lower image, view 300B). In this exemplary embodiment, three supports 310 suspend the motor 302 and spinner plate 304 from the hopper above (not shown in FIG. 3), but additional supports, such as four supports, could be used to support the motor. As seen in these images, the motor-driven distribution mechanism 102 includes a lower portion 302 that houses the motor (not visible in these images) that spins the spinner plate 304 having blades 306 that disperse feed dropping down 308 from the hopper (not visible in these images) as the spinner plate 304 rotates. It should be clear that the dispersion of the feed will be is essentially 360° since there is no significant impediments in any direction from the spinner plate 304.

Figure 4:
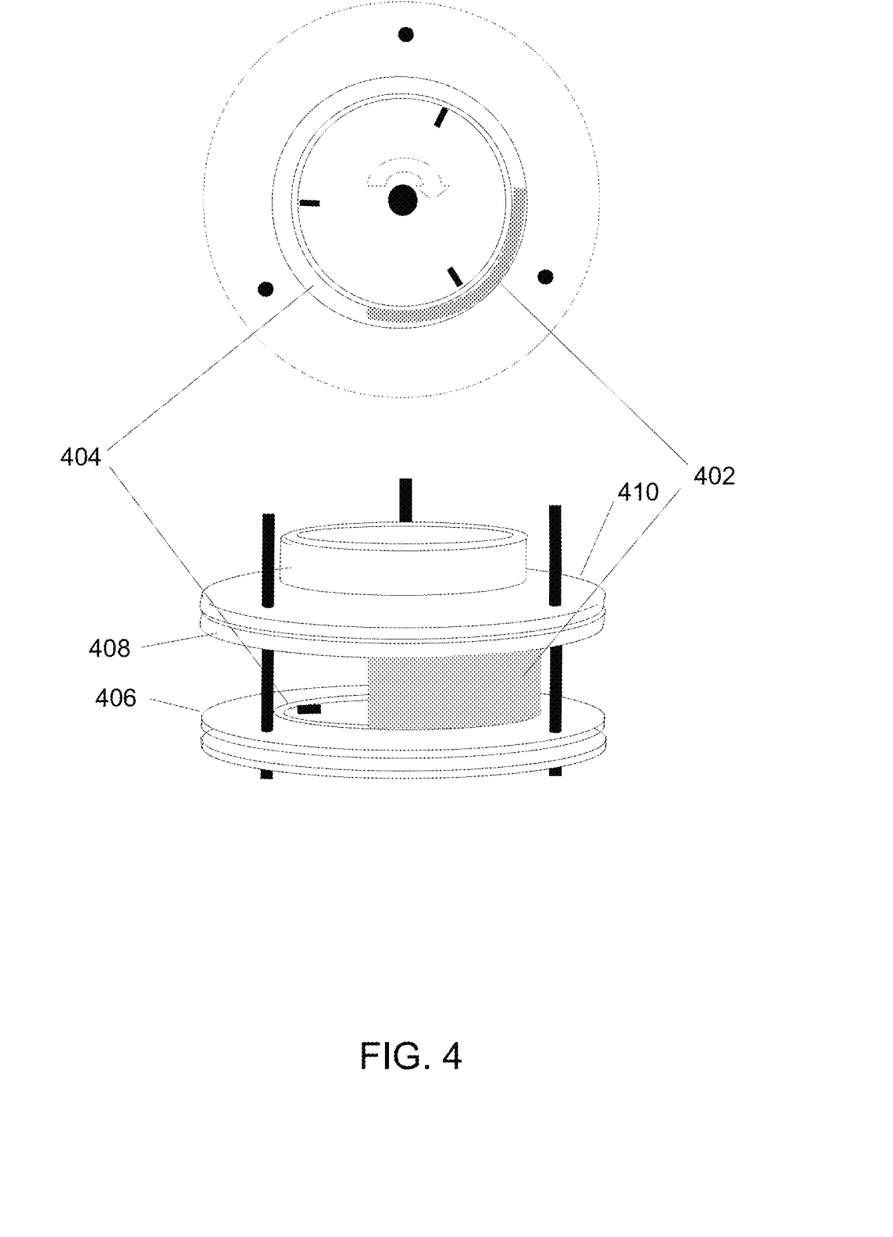
FIG. 4 illustrates a directional distribution mechanism of the present invention, as a directional diverter 402 that can be selectively located anywhere in the 360° distribution capability of the motor-driven distribution mechanism, and, in some embodiments, can be detached at will.

FIG. 4 shows how the present invention modifies the motor-driven feed distribution mechanism 102 to incorporate directional capability by adding a directional diverter 402. The present invention includes a number of variations on how the directional diverter 402 can be incorporated but these variations are considered as non-limiting since the present invention should be considered as disclosing using a directional diverter that can be located anywhere around the 360° dispersion pattern of a motor-driven feed distribution mechanism, as shown exemplarily in the inset of FIG. 4.

The directional diverter 402 can be incorporated in the motor-driven feed distribution mechanism in any of various ways. For example, the directional diverter 402 could simply be clamped into a desired position by loosening bolts holding the lower motor housing, placing the directional diverter 402 into position, and then retightening the bolts holding the lower motor housing. Alternatively, in an exemplary embodiment of this aspect of the present invention, a set screw is tightened to lock the direction diverter 402 into a selected position.

In an alternate attachment means, a circular groove 404 conforming to the shape of the directional diverter 402 could be formed in the periphery of the upper surface of a lower plate 406 and/or the lower surface of an upper plate 408, so that the directional diverter 402 can be in slipped into this circular groove 404 and located anywhere around the 360° dispersion pattern. With control of the height dimension, the directional diverter 402 could be configured so that it could be inserted into the circular groove 404 and moved around the circular groove 404 into any position, and then even removed when desired. As yet another possible attachment means, the directional diverter 402 could be sized to fit and be attached around the outside of the rims 406, 408 supporting the upper and lower housings. For example, if a circular groove were to be formed in the upper surface of the upper rim 410, then the directional diverter 402 could be configured to have a lip that slips into this circular groove, and the directional diverter 402 could be rotated anywhere around this upper circular groove.

In yet another variation, as suggested by the insert of FIG. 4, if the directional diverter 402 is configured as having a shape that covers more than 180° and is made of plastic so as to have a predetermined amount of flexibility, then such directional diverter 402 would inherently have a tendency to clamp itself into position when placed in either an internal circular groove 404 or an outer circular groove (not shown).

Additionally, although FIG. 4 exemplarily shows a single directional diverter 402, it should be clear that a plurality of such directional diverters 402 could be used as a way to further narrow a directional dispersion or by permitting multiple directional dispersion windows throughout the 360° dispersion capability. For example, if a directional diverter 402 were to be configured to provide a standard block area, then two such directional diverters 402 could be placed adjacent to each other to provide a 180° block area. If the two 90 degree diverters 402 were to be placed so as not be adjacent, then the resultant dispersion pattern would have two separate distribution areas and two blocked areas. It should also be clear that the present invention envisions, in some embodiments, a directional diverter 402 that is fixedly attached rather than being changed by a simple rotation of the diverter. Thus, in an exemplary embodiment, a set screw is used to lock the diverter into a set location.

Additional variations for configuring a dispersion pattern using one or more directional diverters could be achieved by using one or more directional diverters 402 in the internal groove 404 along with one or more directional diverters 402 inserted in the external groove. Additionally, if more than one internal circular groove 404 is formed concentrically in the upper surface of the periphery of rim 404 and/or more than one external groove is formed concentrically in the upper surface of the periphery of rim 406, then many more dispersion patterns could be implemented.

The present invention also envisions a kit of parts that would convert a conventional feeder into a configuration that supports this feature. Such a kit would include one or more directional diverters as well as provisions to incorporate such directional diverter(s) into an existing feeder design. Such incorporation provisions could include replacement components upon which the directional diverter(s) are to be mounted, or could include brackets and a set of instructions for drilling holes to mount brackets for supporting the directional diverter(s) to be added.

Third Improvement: Remote Control Timer for Feeder

The third aspect of the present invention provides an animal feeder system that can be selectively controlled remotely to turn on the feeder motor to initiate a feed dispersal event and/or remotely turn ON/OFF a light mounted on or associated with the feeder (sometimes referred to as a "hog light"), including selection of the brightness level of the light.

Overview

In this third aspect, the apparatus of the present invention provides an animal feeder system that incorporates a feeder controller with improvements over conventional controllers, including an interface for a remote controller that allows remote control of a feed dispersal event and/or remote control of turning ON/OFF a light located on an animal feeder.

Apparatus

Figure 5:
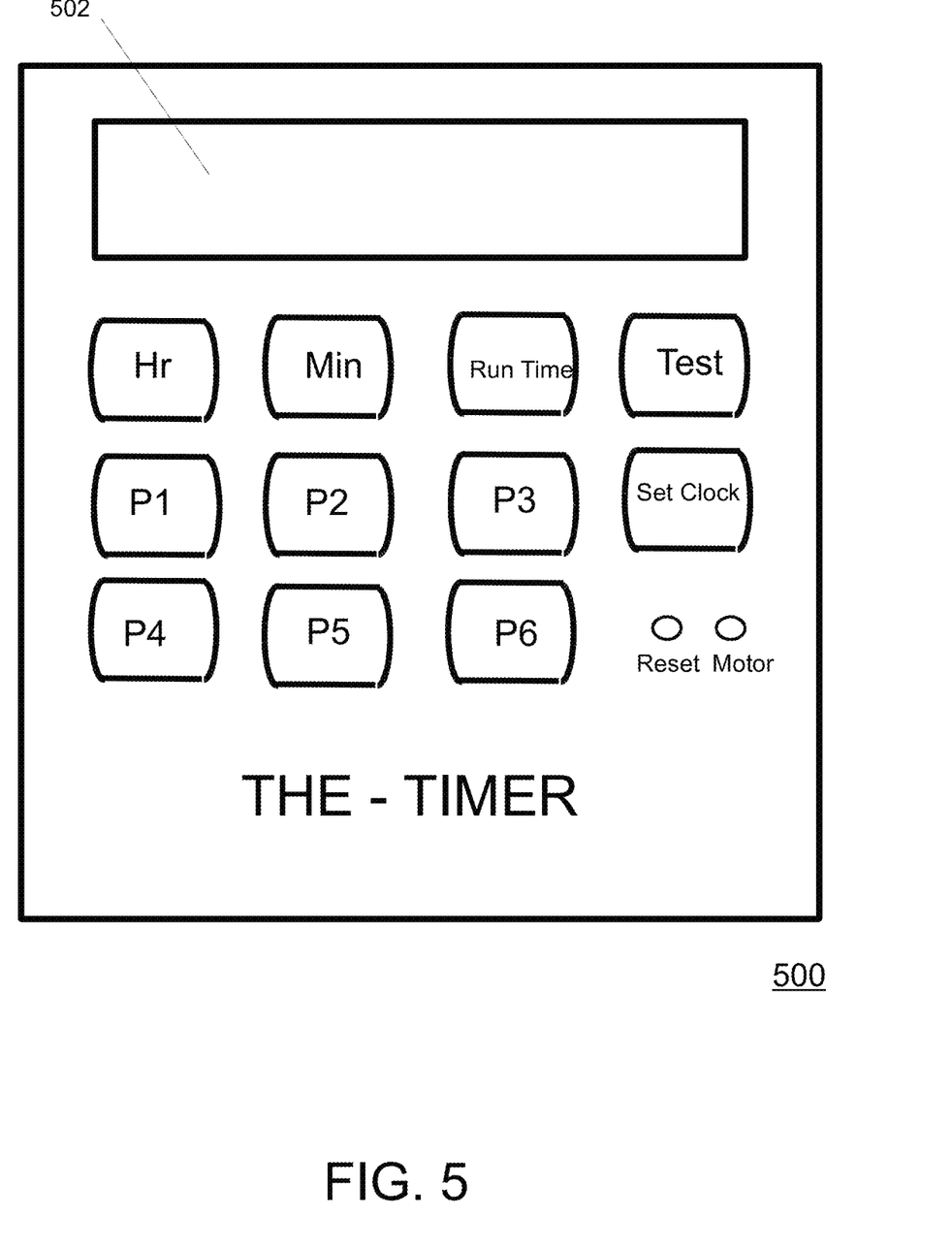
FIG. 5 illustrates a conventional feeder control device 500 mounted on a conventional feeder and that incorporates a timer circuit to permit setting feed dispersion events at preset times and preset durations.

FIG. 5 shows a conventional feeder timer controller that has been incorporated into a conventional animal feeder. This conventional timer controller included a display 502 and receives power from a battery (not shown in FIG. 5) also incorporated on the feeder and is connected to the motor such as to provide a timer function to operate the motor a preset length of time in accordance with up to six different preset programs P1-P6. A user interface permits a user to set current clock time and then set the time and period of up to six dispersal programs P1-P6. This conventional timer controller 500 must be manually set to preset a time that a feed dispensing will occur and a preset length of time, from zero to 30 seconds, for each such dispersal event, or the TEST switch can be pressed to manually operate the motor.

The present inventor has recognized that the conventional timer control module 500 could be improved in several ways.

Figure 6:
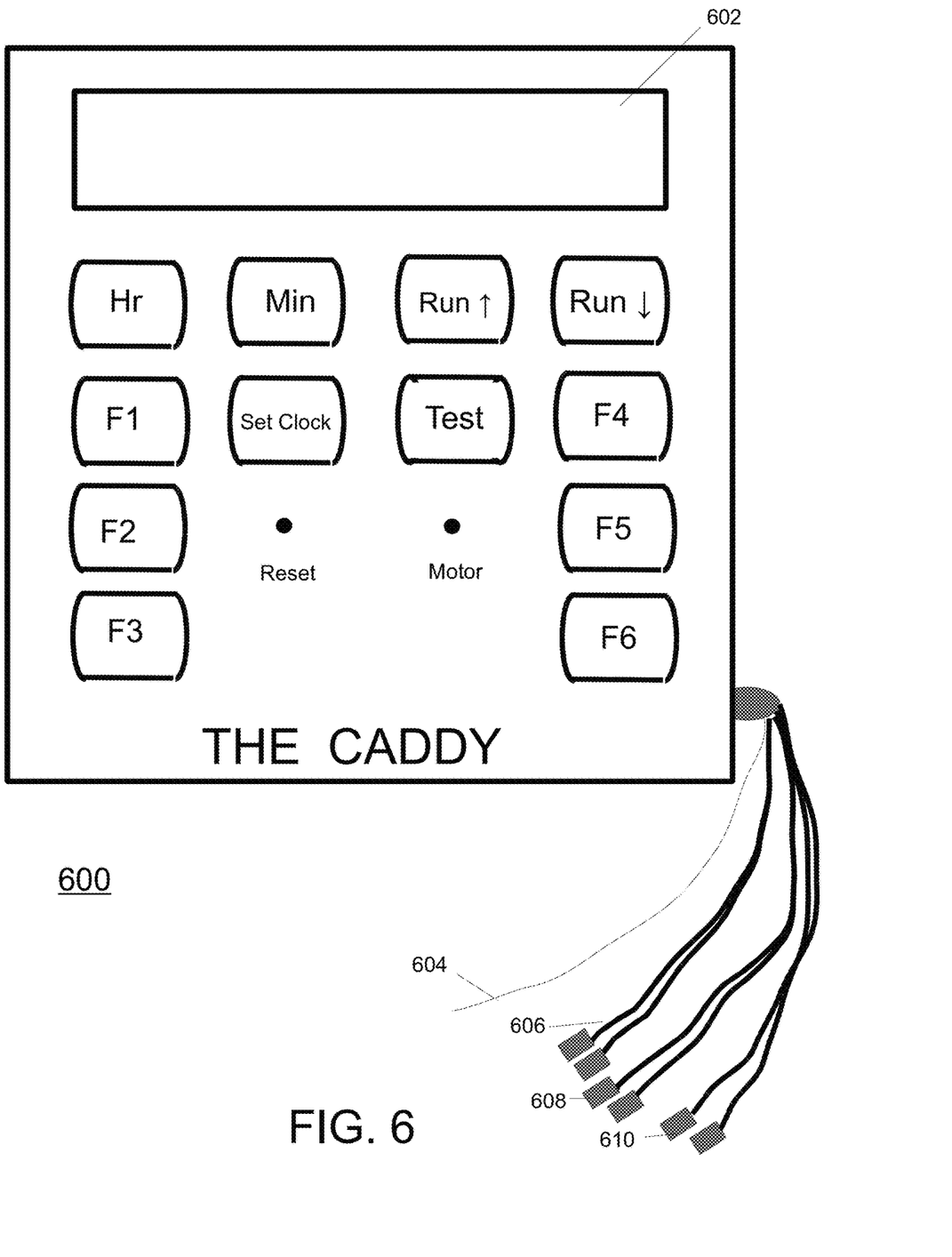
FIG. 6 illustrates an exemplary feeder control device 600 of the present invention as incorporated on an animal feeder that provides a modified timer function for controlling feed dispersal events, as well as incorporating capability to turn on a light located on or associated with the feeder, and capability to interface with a remote controller (see FIG. 7) that permits a user to remotely initiate a feed dispersal event and/or remotely turn ON/OFF a light mounted on or associated with the feeder.
Figure 7:
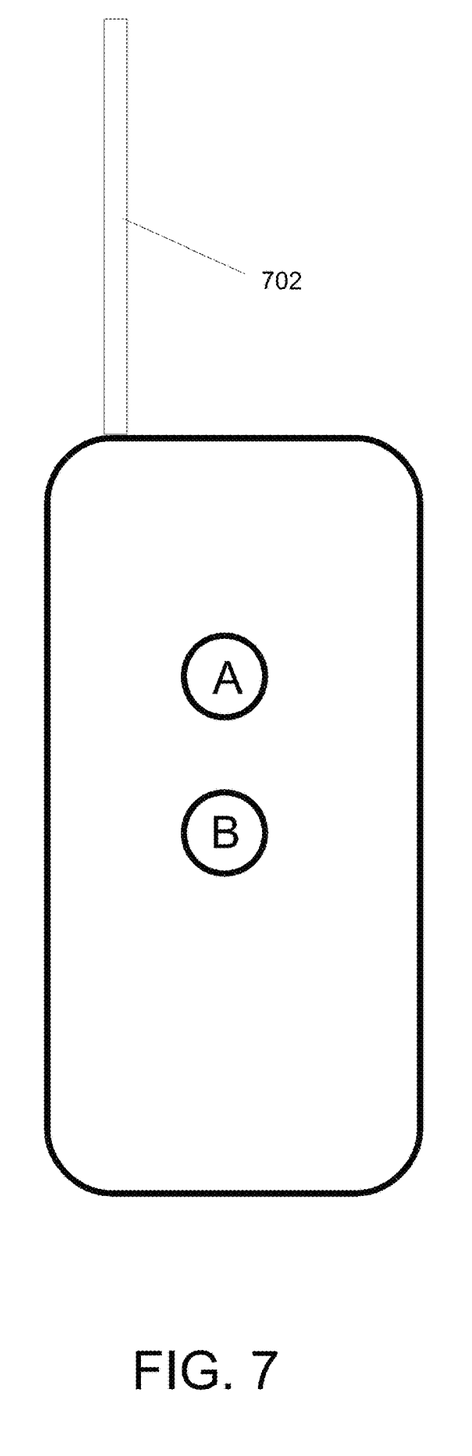
FIG. 7 illustrates an exemplary embodiment of a remote controller 700 for the feeder control device in accordance with one exemplary embodiment of the present invention.

FIG. 6 shows an exemplary embodiment of an improved timer controller 600 of the present invention that also incorporates a display 602 and up to six dispersal functions F1-F6. to include an antenna wire 604 and built-in receiver module (not shown in FIG. 6) so that the timer controller 600 can interface with a remote controller 700 (shown exemplarily in FIG. 7). The controller unit 600 includes interface wiring 606 to control the motor on the feeder used to spin a spinner plate that disperses feed and wiring 608 to a battery that provides power to the controller unit 600, the motor, and a hog light mounted on or associated with the feeder, and wiring 610 that controls power to the hog light on the feeder. The timer controller 600 also includes a backup battery so that the timer settings are retained in memory when the main battery providing power to the timer controller, motor, and hog light is disconnected or drops below a normal operating voltage level.

Similar to the conventional timer controller shown in FIG. 5, the improved controller 600 of the present invention can be manually set for the current clock time and to preset a dispersal time and period for each of the six dispersal functions F1-F6. In contrast to the conventional timer controller of FIG. 5, the controller of the present invention shown exemplarily in FIG. 6, permits a longer dispersal period, for example, up to 300 seconds, as can be set by the RUN ↓ and RUN ↑ buttons. This longer dispersal period is useful when a feeder is used for high protein feed distribution events in which a lot more feed is desired to be dispersed. The MOTOR red light comes on to indicate a problem with the feeder motor.

Additionally, relative to the conventional timer controller shown in FIG. 5, the improved controller 600 of the present invention also includes additional wiring 610 to a light mounted on or associated with the feeder, and the antenna wire 604 that receives signals from a remote control unit such as shown in FIG. 7.

FIG. 7 exemplarily shows a remote control unit 700 including antenna 702 that permits remote control for turning on the feeder motor to cause a dispersal event and/or for turning ON/OFF a hog light mounted on the feeder. Various control mechanisms for a remote dispersal event and the light control would be possible.

For example, in a preferred exemplary embodiment, a remote dispersal event is implemented as long as the button A on the remote controller is pressed. However, other remote control mechanisms would be possible based on the control algorithm programmed in improved controller 600. For example, a remote dispersal event could be initiated by pressing button A once and continues until button A is pressed a second time. Another possible mechanism might be to initiate a remote dispersal event by pressing button A and providing a second button that would be pressed to terminate the remote dispersal event. Another possible mechanism might be to provide a remote dispersal event upon pressing button A, for a preset time period that has been previously set in the improved controller 600.

The second function controlled by the remote controller is button B that controls a light mounted on or at least associated with the feeder. Again, various control algorithms could be programmed into the improved controller 600 for remotely controlling this light.

For example, in a preferred exemplary embodiment, pressing button B a first time turns the light on to a low level, pressing a second time increases the brightness level, and pressing a third time turns the light off. However, other control mechanisms are possible, such as controlling the light intensity by the amount of time that button B is pressed on the remote controller, and other control mechanisms would be possible if more than one light control button is provided on the remote controller. Additionally, more than two light brightness intensity levels could be implemented, and more than one light could be mounted on the feeder, possibly even with different control for each light.

In an exemplary prototype embodiment of the remote control unit 700, the range for remotely controlling the improved timer controller 600 for button A is 150 yards+, although additional range of up to 300 yards has been achieved with the prototype, in which pulsating (intermittent) control of the feeder controller 600 results at higher ranges. However, these range capabilities are exemplary only and not intended as limiting to the invention.

The light (or lights) controlled by the brightness button B could be permanently mounted to the feeder, for example, using bolts, but there are alternatives to this specific configuration. For example, rather than being hardwired and permanently attached, the light (or lights) could be hardwired using a flexible cord that permits the light to be aimed and/or moved to different points on the feeder or even hung on a tree limb or other object located near the feeder. Additionally, the brightness button B could be wired to provide power to an electrical receptacle (or multiple receptacles at different locations on the feeder), so that a lamp could be plugged into the receptacle as desired, including scenarios in which the receptacle is used with a lamp fixture having cord and plug connector (or equivalent).

The present invention also envisions a kit of parts that would convert a conventional feeder to include this timer controller 600 and associated remote control unit 700.

Figure 8:
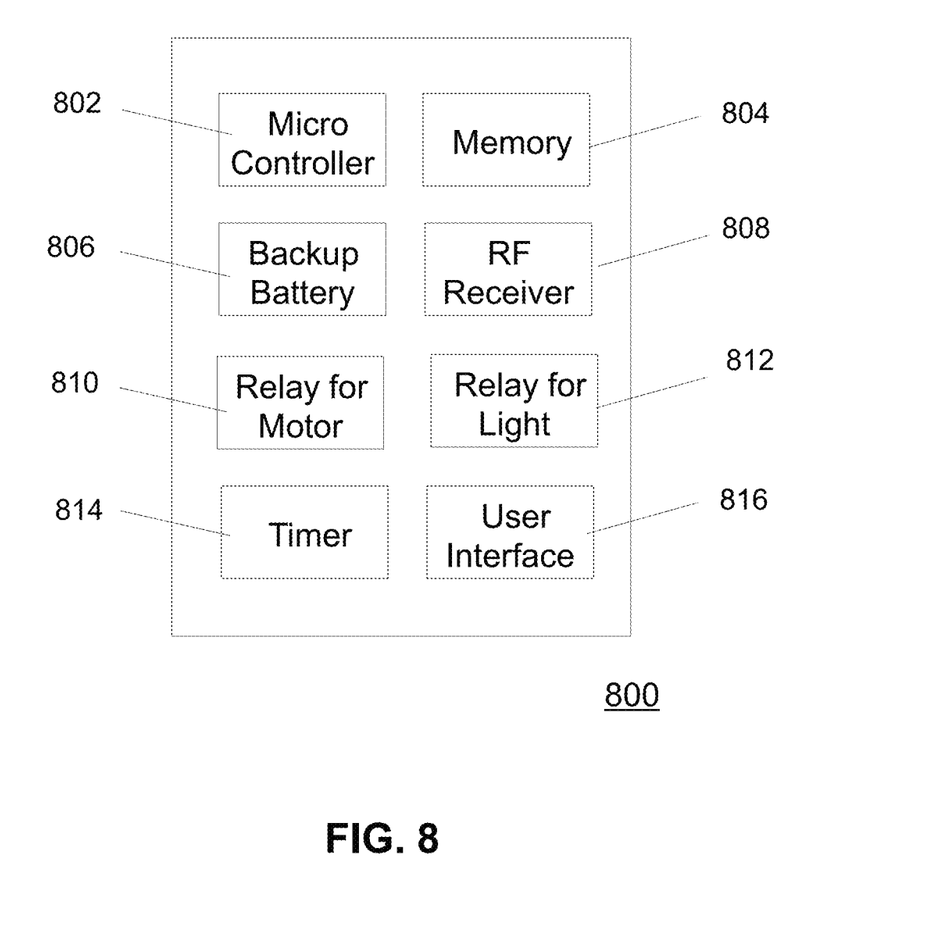
FIG. 8 shows an exemplary block diagram 800 of the feeder controller 600.

FIG. 8 illustrates an exemplary block diagram 800 of a timer controller 600 of the invention. Microcontroller 802 contains firmware to implement the control functions of the timer controller as described above, with an associated memory 804 to store values for the six dispersal functions F1-F6. Backup battery 806 maintains values stored in this memory should the main battery (e.g., 12 VDC battery, possibly augmented by a solar cell to keep the main battery charged) of the feeder be disconnected or fall below a useable value. RF receiver 808 receives radio signals from a transmitter in the remote control unit via the antenna wire. The motor relay 810 controls current from the main battery to the motor during dispersal events, and the light relay 812 controls current from the main battery when the light is turned ON, including a dropdown resistance circuit when the light is ON at a reduced brightness. The timer 814 provides clock timing pulses for the microcontroller 802, including providing the capability to provide different timing periods for dispersal events. The user interface 816 provides the interface between the microcontroller 802 and the buttons on the front of the timer controller 600.

ADDITIONAL CONSIDERATIONS

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for creating an interactive message through the disclosed principles herein. Thus, while particular embodiments and applications have been illustrated and described, it is to be understood that the disclosed embodiments are not limited to the precise construction and components disclosed herein. Various apparent modifications, changes and variations may be made in the arrangement, operation and details of the method and apparatus disclosed herein without departing from the spirit and scope defined in the appended claims.

What is claimed is:

1. An animal feed dispersal system, comprising;
a feeder apparatus, comprising:
  a hopper to store animal feed to be dispersed;
    a spinner plate beneath the hopper, wherein the spinner plate is configured to radially spread feed dropping from an opening in a bottom of the hopper;
    a motor coupled to the spinner plate and configured for spinning the spinner plate; and
    a timer control unit configured to provide a timer control of the motor during a feed dispersal event;
  a remote controller comprising a transmitter configured to transmit signals to remotely control one or more functions on the feeder apparatus; and
  a mode transition mechanism to transfer feed dispersal events between a broadcast mode in which feed is broadcast radially outward, and a trough mode in which feed is diverted into one or more troughs associated with the animal feed dispersal system,
    wherein the timer control unit on the feeder apparatus comprises an antenna that receives signals transmitted by the remote controller transmitter.

2. The animal feed dispersal system of claim 1, wherein the remote controller comprises a button configured for being pushed by a user in order to implement a remotely initiated feed dispersal event.

3. The animal feed dispersal system of claim 1, wherein the feeder apparatus further comprises at least one light, wherein the timer control unit on the feeder apparatus is further configured with a provision for remotely turning the at least one light ON and OFF, using signals received from the remote controller.

4. The animal feed dispersal system of claim 3, wherein the remote controller comprises a button configured for being pushed by a user in order to remotely control the at least one light on the feeder apparatus, and wherein the timer control unit on the feeder apparatus is configured to turn ON the at least one light on the feeder apparatus to a first brightness intensity level when the button on the remote controller is pressed a first time, to a second brightness intensity level when the button is pressed a second time, and to turn the at least one light OFF when the button is pressed a third time.

5. The animal feed dispersal system of claim 1, wherein a range of operation of the remote controller is at least approximately 150 yards.

6. The animal feed dispersal system of claim 1, wherein the timer control unit on the feeder apparatus further incorporates a timer setting feature permitting a manual setting for one or more feed dispersal events each at a preset time and a preset duration.

7. The animal feed dispersal system of claim 1, wherein the remote controller and the timer control unit on the feeder apparatus are incorporated into the animal feed dispersal system as components of a retrofit kit of parts.

8. The animal feed dispersal system of claim 1, further comprising:
  a main battery to supply current to operate the motor that spins the spinner plate during feed dispersal events; and
  a backup battery that maintains setting information in the timer control unit for a time and a duration of the feed dispersal event when the main battery is disconnected or no longer provides sufficient voltage to operate the timer control unit.

9. The animal feed dispersal system of claim 8, wherein the timer control unit incorporates provisions for setting a plurality of preset feed dispersal events and wherein the backup battery maintains times and durations of all the preset feed dispersal events should the main battery be disconnected or drop in output voltage.

10. The animal feed dispersal system of claim 1, further comprising a directional deflector that blocks dispersal of feed in a predetermined range of directions.

11. An apparatus, comprising:
  a hopper to store animal feed to be distributed, an opening at a bottom of the hopper permitting feed to drop out of the hopper for distribution;
  a motor-driven spinner plate beneath the hopper configured to spread feed dropping from the opening in the bottom of the hopper radially outward from the motor-driven spinner plate; and
  a distribution adapter having a first position in which feed from the motor-driven spinner plate is allowed to be broadcast outwardly to an area surrounding the apparatus and a second position in which feed from the motor-driven spinner plate is deflected downward to be distributed into a plurality of troughs associated with the apparatus rather than being broadcast to the surrounding area.

12. The apparatus of claim 11, wherein the distribution adapter comprises a plurality of flaps that are hinged such that, in the first position, the flaps are raised to be in a hidden position so that the feed from the motor-driven spinner is broadcast outwardly without interference, and, in the second position, the flaps are lowered to form a capturing device such that the feed from the motor-driven spinner plate is deflected into an inverted funnel to be spread into the plurality of troughs associated with the apparatus.

13. The apparatus of claim 11, wherein the associated troughs are solidly attached to a frame of the apparatus.

14. The apparatus of claim 11, wherein the associated troughs are selectively attachable to a frame of the apparatus.

15. The apparatus of claim 11, wherein the associated troughs are not attached to the apparatus but are positioned to catch feed dropping from the inverted funnel.

16. The apparatus of claim 11, wherein the motor-driven spinner plate is configured to be in a lowered position when the motor-driven spinner plate is spinning, thereby permitting feed from the hopper to drop out of the bottom opening of the hopper, and to be in a raised position when the motor-driven spinner plate is no longer spinning, thereby closing off the bottom opening of the hopper to stop the feed from dropping through the bottom opening of the hopper.

* * * * *